United States Patent [19]

Wright

[11] Patent Number: 5,303,569
[45] Date of Patent: Apr. 19, 1994

[54] SPARE TIRE LOCKING DEVICE

[76] Inventor: John O. Wright, 814 Timberlane, Glenwood, Iowa 51534

[21] Appl. No.: 63,155

[22] Filed: May 18, 1993

Related U.S. Application Data

[63] Continuation of Ser. No. 932,240, Aug. 19, 1992, abandoned.

[51] Int. Cl.$^5$ .................. E05B 65/12; B62D 43/02
[52] U.S. Cl. ................... 70/259; 224/42.24; 224/42.25
[58] Field of Search ............ 70/259, 260, 54–56, 70/225; 224/42.24, 42.25, 42.26

[56] References Cited

U.S. PATENT DOCUMENTS

| | | | |
|---|---|---|---|
| 3,822,814 | 7/1974 | Baldi | 224/42.25 |
| 4,031,719 | 6/1977 | Klingler et al. | 70/56 |
| 4,076,158 | 2/1978 | Barr | 70/259 |
| 4,294,088 | 10/1981 | Barr | 70/259 |
| 4,308,733 | 1/1982 | Tampa | 70/232 |
| 4,516,706 | 5/1985 | Niehaus | 224/42.25 |
| 4,751,833 | 6/1988 | Stumpf, Jr. | 70/259 |
| 4,794,771 | 1/1989 | Princell | 70/259 |
| 4,873,851 | 10/1989 | Arnett | 70/259 |
| 4,915,274 | 4/1990 | Oliver | 224/42.25 |

FOREIGN PATENT DOCUMENTS

| | | | |
|---|---|---|---|
| 515977 | 12/1920 | France | 70/259 |
| 265943 | 9/1927 | United Kingdom | 224/42.24 |

Primary Examiner—Peter M. Cuomo
Assistant Examiner—Darnell M. Boucher
Attorney, Agent, or Firm—Zarley, McKee, Thomte, Voorhees & Sease

[57] ABSTRACT

A spare tire locking device is described including an upstanding arm which extends upwardly and outwardly from a frame member on a boat trailer or the like. A flat based plate is secured to the upper end of the arm and has a pair of threaded studs extending therefrom in a horizontal fashion. An arcuate bracket is spaced from the threaded studs and extends outwardly from the base plate and has an opening formed therein adapted to receive the shackle of a padlock. The spare tire is mounted on the base plate by extending the threaded studs through lug holes in the wheel of the spare tire. When the spare tire is so positioned, the bracket extends through the hub hole in the wheel closely adjacent the wheel. When the shackle of a padlock is extended through the bracket, the spare tire cannot be removed from the base plate even though the nuts on the threaded studs are removed.

11 Claims, 4 Drawing Sheets

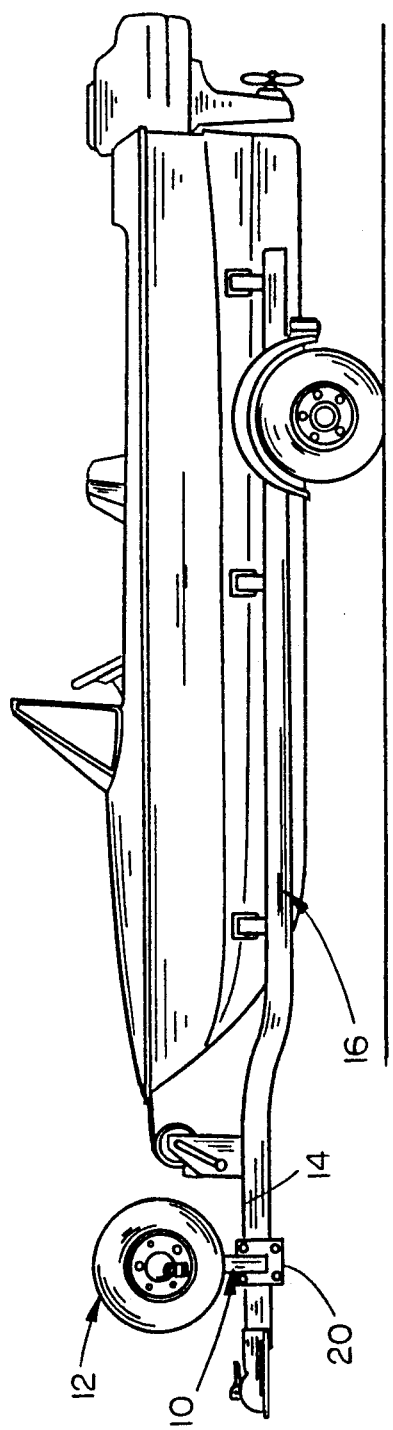
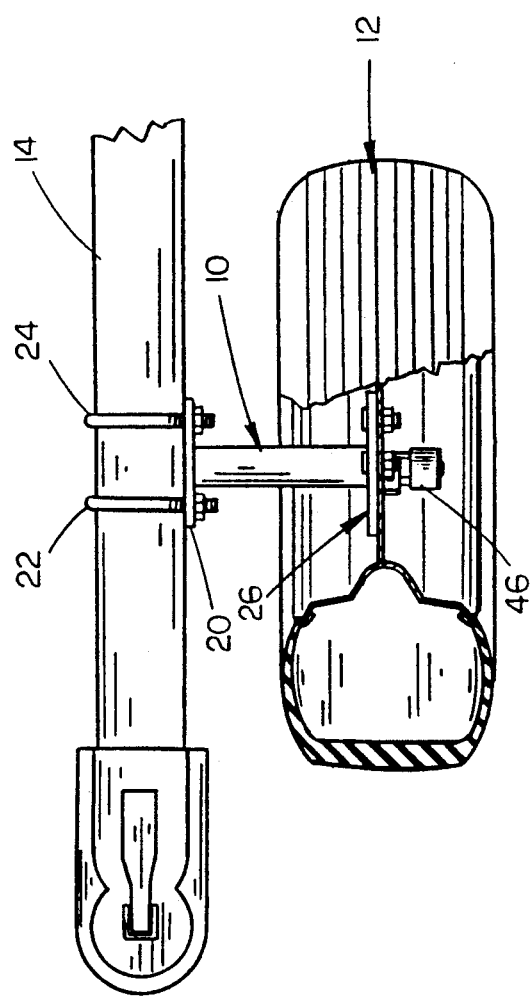

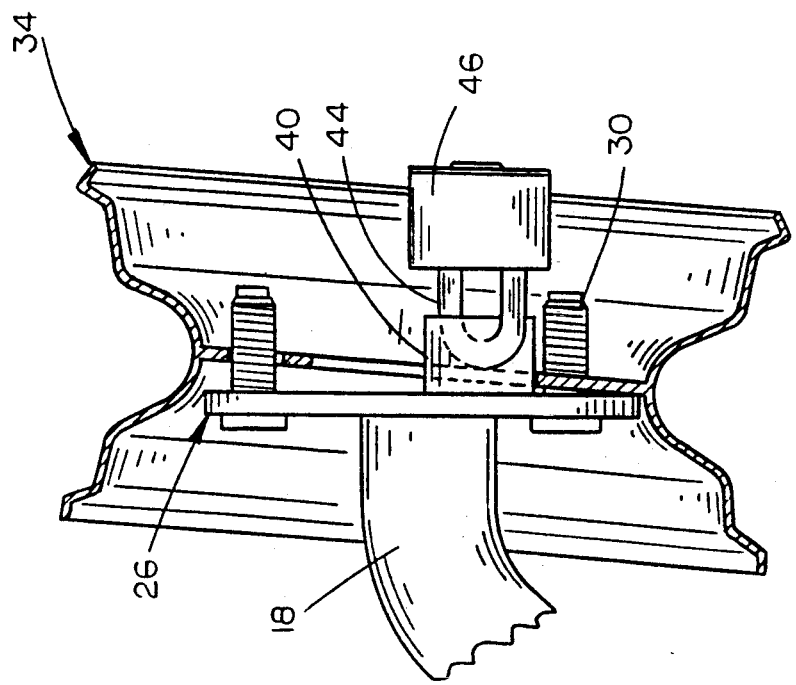
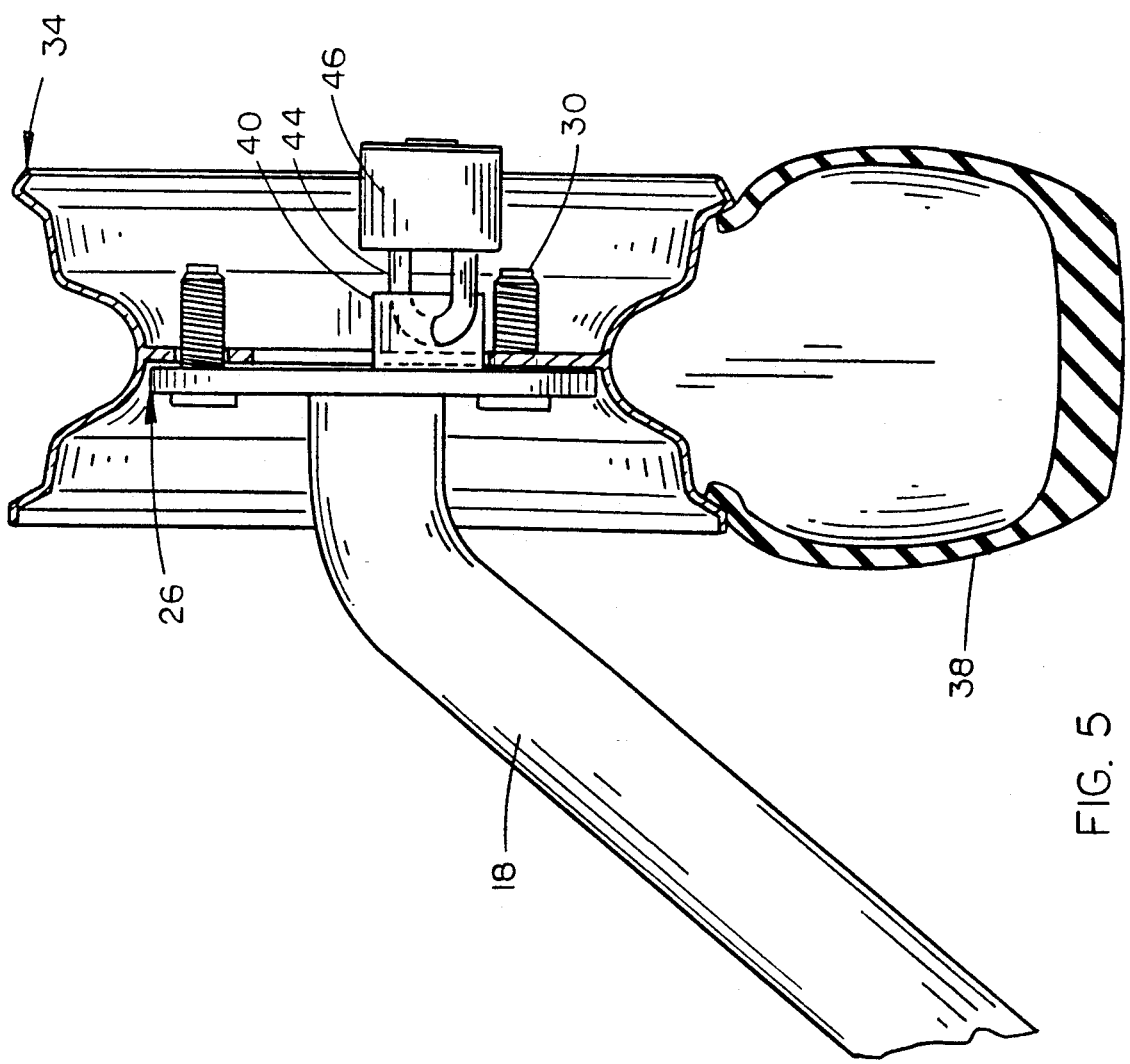

5,303,569

SPARE TIRE LOCKING DEVICE

CROSS-REFERENCE TO RELATED APPLICATION

This is a continuation application of Ser. No. 07/932,240 filed Aug. 19, 1992 now abandoned.

BACKGROUND OF THE INVENTION

This invention relates to a locking device and more particularly to a spare tire locking device designed especially for boat trailers although a locking device may also be used on other types of vehicles.

Spare tires for boat trailers are normally secured to some type of support brackets which are mounted on the frame of the trailer. The tires are normally secured to the support by means of lug nuts mounted on threaded studs which extend from the support through the lug holes in the wheel. If no other means is used to secure the spare tire to the boat trailer, the spare tire may be easily stolen by simply removing the lug nuts from the threaded studs.

Many types of devices have been previously provided in an attempt to prevent the unauthorized removal of the spare tires from their mounting brackets or support means. However, the prior art devices are cumbersome to use and frequently are quite expensive. Further, the prior art devices are not as fool-proof as they should be.

It is therefore the principal object of the invention to provide a spare tire locking device.

A further object of the invention is to provide a locking device for locking a spare tire on a boat trailer.

A further object of the invention is to provide a spare tire locking device which may also be used on vehicles such as trucks, etc.

A further object of the invention is to provide a locking device for spare tires which is inexpensive.

Still another object of the invention is to provide a locking device for a spare tire which is convenient to use.

Still another object of the invention is to provide a locking device for a spare tire which is durable in use.

These and other objects of the present invention will be apparent to those skilled in the art.

BRIEF DESCRIPTION OF THE DRAWINGS

FIG. 1 is a side view of a boat trailer having the locking device of this invention mounted thereon;

FIG. 2 is a partial top view of the locking device mounted on a boat trailer;

FIG. 5 is a partial front view of the locking device with portions of the spare tire cut away to more fully illustrate the invention; and FIG. 6 is a view similar to FIG. 5 but which illustrates the manner in which the padlock maintains the spare tire on the device even though the lug nuts have been removed.

SUMMARY OF THE INVENTION

Figure 3:
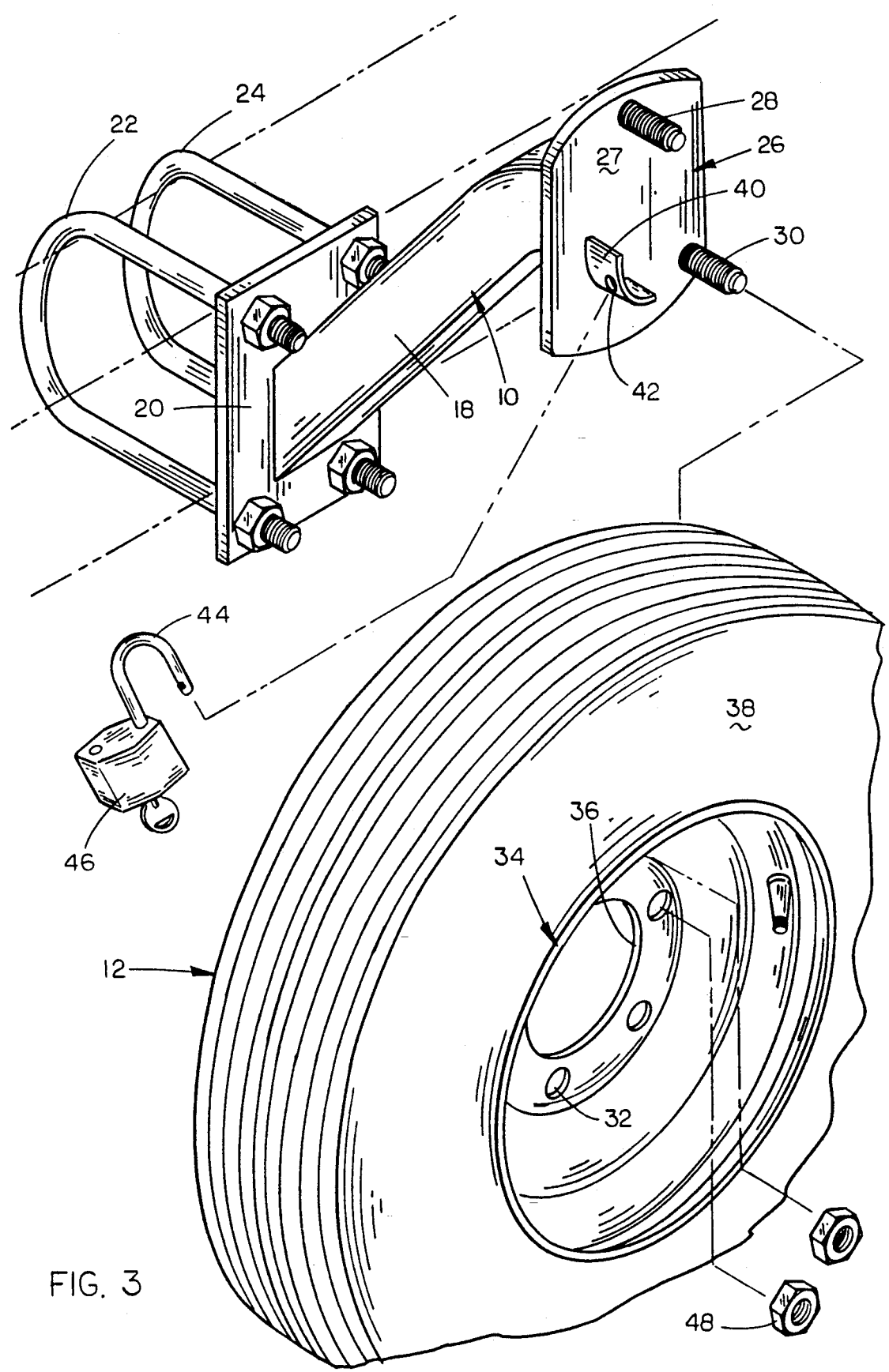
FIG. 3 is an exploded perspective view of the locking device of this invention.
Figure 4:
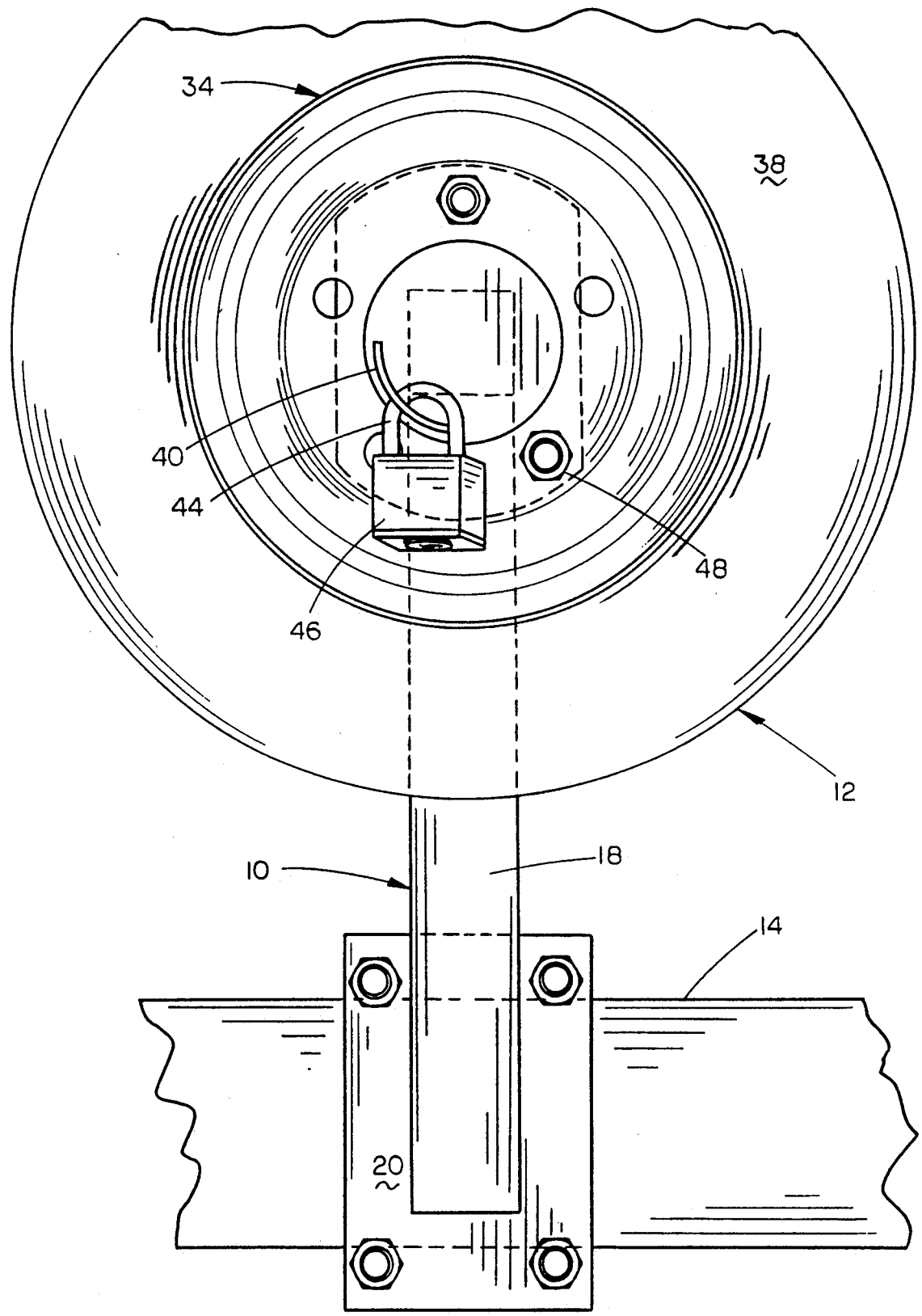
FIG. 4 is a side elevational view of the locking device.

A spare tire locking device is disclosed which is ideally suited for use on a boat trailer but which may also be used on other types of vehicles such as trucks, etc. The locking device comprises an elongated upstanding support arm which is secured at its lower end to a frame member on the boat trailer and which extends upwardly and outwardly therefrom. A vertically disposed flat base plate is secured to the upper end of the arm and has one or more threaded studs extending horizontally therefrom. An arcuate bracket is positioned on the base plate and is spaced from the threaded studs. The threaded studs are designed to be received in lug holes of the spare tire and the arcuate bracket is adapted to extend through the hub hole of the wheel. The wheel is mounted on the base plate and lug nuts are mounted on the threaded studs to securely maintain the spare wheel in position. A padlock is extended through the bracket outwardly of the wheel to prevent theft of the spare tire. The spare tire cannot be removed from the base plate even though the lug nuts are removed therefrom due to the relationship of the threaded studs and the arcuate bracket.

DESCRIPTION OF THE PREFERRED EMBODIMENT

The numeral 10 refers to the locking device of this invention which is ideally suited for locking a spare tire 12 onto a frame member 14 of a boat trailer 16. Although the device is particularly well-suited for use on a boat trailer, the device may also be used on other vehicles such as trucks or the like with a small amount of modification being made to the apparatus inasmuch as it is the actual locking device provided at the upper end of the apparatus which is believed to be novel.

Locking device 10 includes an inclined or upstanding arm 18 having a plate 20 welded or otherwise secured to the lower end thereof. Plate 20 is adapted to have a pair of U-bolts or square-bolts 22 and 24 secured thereto to mount the plate 20 to one side of frame member 14. Suitable locking devices would be provided on the bolts 22 and 24 to prevent the entire assembly from being removed from the trailer.

A vertically disposed base plate 26 is welded to the upper end of arm 18 and includes an outer surface 27. One or more threaded studs 28 and 30 extend horizontally from the outer surface of the plate 26 in a spaced apart relationship as seen in the drawings. Studs 28 and 30 are adapted to extend through the lug openings 32 in the wheel 34. As seen in FIG. 3, wheel 34 includes a hub opening 36. Tire 38 is mounted on wheel 34 in conventional fashion.

An arcuate bracket 40 extends transversely from outer surface 27 and has an opening 42 formed therein adapted to receive the shackle 44 of padlock 46. Bracket 40 is adapted to extend through the hub opening 36 closely adjacent the wheel as illustrated in the drawings.

The spare tire is mounted on the plate 26 by extending the studs 28 and 30 through suitable lug holes 32 and by extending the bracket 40 through the hub opening 36 as seen in the drawings. Lug nuts 48 are then threaded on the studs 28 and 30 to maintain the spare tire on the device in a secure fashion. Shackle 44 of padlock 46 is then extended through the opening 42 outwardly of wheel 34 to positively lock the spare tire on the device. As seen in FIG. 6, even if the lug nuts 48 are removed from the studs 28 and 30, the engagement of shackle 44 with the wheel 34 immediately outwardly of the hub opening 36 prevents the spare tire from being removed from the device.

It should be noted that it is the cooperation and the relationship between the bracket 40 and one or more of the threaded studs which prevents the spare tire from being removed from the bracket when the padlock 46 is in place. Although the device will function with a single stud being present, it is recommended that at least a pair of the studs be utilized.

Even though the device is particularly well-suited for use on a boat trailer as previously described, it should be noted that the base plate 26 could be supported on various types of other structures so that the base plate 26 could be utilized on a vehicle such as a truck or the like.

It can therefore be seen that a novel locking device has been provided for a spare tire which enables the spare tire to be placed thereon in a convenient fashion. The locking device of this invention is quite inexpensive and truly ensures that the spare tire may not be stolen from its supporting means. It can therefore be seen that the invention accomplishes at least all of its stated objectives.

I claim:

1. A locking device for locking a spare tire on a vehicle, said spare tire including a tire mounted on a wheel having a hub with a hub opening and a plurality of lug openings formed therein, comprising;
   a flat base plate having an outer surface;
   means operatively connecting said base plate to said vehicle;
   at least one threaded stud projecting transversely from said outer surface of said base plate, said stud adapted to threadably receive a lug nut thereon;
   an arcuate bracket irremovably affixed to and extending transversely from said outer surface of said base plate;
   said threaded stud extending through one of the lug holes in said spare tire, when the spare tire is positioned adjacent the outer surface of said base plate;
   said arcuate bracket elongated and curved to an arcuate form following the curvature of the hub opening and extending through the hub opening in the spare tire closely adjacent the wheel when said spare tire is positioned adjacent the outer surface of said base plate;
   said bracket having an opening formed therein for receiving the shackle of a padlock.

2. The locking device of claim 1 wherein said means connecting said base plate to said frame member comprises an upstanding arm having upper and lower ends, said base plate being secured to the upper end of said arm in a vertically disposed condition.

3. The locking device of claim 1 wherein a plurality of spaced apart threaded studs extend from said base plate.

4. The locking device of claim 1 wherein said bracket has approximately the same radius of curvature as said hub opening.

5. In combination:
   a locking device for locking a spare tire on a vehicle, including:
   a base plate connected to said vehicle, said base plate having an outer, generally flat surface;
   a threaded stud affixed to said base plate outer surface and projecting outwardly therefrom;
   a fixed bracket contacting said base plate outer surface and projecting outwardly therefrom, said bracket spaced away from said stud; and
   a spare tire including a tire mounted on a wheel having a hub with a hub opening and a plurality of stud openings formed therein;
   said spare tire removably mounted on said base plate with one of said stud openings engaging said stud, and said bracket projecting through said hub opening closely adjacent wheel hub; and
   lock means removably connected to said bracket for preventing removal of said spare tire from said base plate.

6. The combination of claim 5, wherein said bracket is elongated and curved to a radius following the curvature of the hub.

7. The combination of claim 6, wherein said bracket has an opening formed therein for selective receipt of a portion of said lock means.

8. The combination of claim 7, wherein said lock means includes a padlock with an operable shackle, the shackle removably mounted through said bracket opening.

9. The combination of claim 8, wherein said bracket opening and shackle are located such that said wheel cannot be removed from the base plate due to engagement of the hub with the stud.

10. A locking device for locking a spare tire on a vehicle, said spare tire including a tire mounted on a wheel having a hub with a hub opening and a plurality of lug openings formed therein, comprising;
    a flat base plate having an outer surface;
    means operatively connecting said base plate to said vehicle;
    at least one threaded stud projecting transversely from said outer surface of said base plate, said stud adapted to threadably receive a lug nut thereon;
    an elongated bracket having a longitudinal axis, affixed to and extending transversely from said outer surface of said base plate;
    said threaded stud extending through one of the lug holes in said spare tire, when the spare tire is positioned adjacent the outer surface of said base plate;
    said bracket curved along its longitudinal axis to an arcuate form following the curvature of the hub opening and extending through the hub opening in the spare tire closely adjacent the wheel when said spare tire is positioned adjacent the outer surface of said base plate;
    said bracket having an opening formed therein for receiving the shackle of a padlock.

11. The locking device of claim 10, wherein said bracket is affixed to said base plate with its longitudinal axis parallel to the outer surface of the base plate.

* * * * *